United States Patent
Fausak et al.

(10) Patent No.: US 9,183,059 B1
(45) Date of Patent: Nov. 10, 2015

(54) VM CLIENT ADMINISTRATIVE INTERFACE FOR VIRTUAL MACHINE INSTANTIATION ALLOWS A USER TO SELECT FROM A SUBSET OF PREDETERMINED AVAILABLE RESOURCES ASSIGNED TO THE USER

(75) Inventors: Andrew T. Fausak, San Jose, CA (US); Oleg Rombakh, San Jose, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 350 days.

(21) Appl. No.: 13/487,136

(22) Filed: Jun. 1, 2012

(51) Int. Cl.
    G06F 9/50    (2006.01)
    G06F 9/455   (2006.01)
    H04L 12/24   (2006.01)

(52) U.S. Cl.
    CPC .............. *G06F 9/5077* (2013.01); *G06F 9/455* (2013.01); *H04L 41/5012* (2013.01)

(58) Field of Classification Search
    None
    See application file for complete search history.

(56) References Cited

U.S. PATENT DOCUMENTS

| | | | | |
|---|---|---|---|---|
| 5,946,487 A * | 8/1999 | Dangelo | ........................ | 717/148 |
| 8,166,478 B2 * | 4/2012 | Jess et al. | ........................... | 718/1 |
| 8,577,885 B2 * | 11/2013 | Ripberger | ...................... | 707/737 |
| 2009/0282404 A1 * | 11/2009 | Khandekar et al. | ............... | 718/1 |
| 2012/0173730 A1 * | 7/2012 | Krumpe, Jr. | .................. | 709/226 |

* cited by examiner

*Primary Examiner* — Meng An
*Assistant Examiner* — Jorge A Chu Joy
(74) *Attorney, Agent, or Firm* — Baker Botts L.L.P.

(57) ABSTRACT

Systems and methods for providing a virtual machine client administrative interface are provided. In some aspects, a method includes providing for display of a virtual machine creation console via operation of a virtual machine hosting environment, the virtual machine creation console indicating a set of predetermined available resources for virtual machine creation. The method includes facilitating receiving, from a user, an input via the virtual machine creation console, the input defining a portion of the set of predetermined available resources and one or more virtual machines to be created with the portion of the set of predetermined available resources. The method includes facilitating creating the one or more virtual machines.

22 Claims, 9 Drawing Sheets

VM CLIENT ADMINISTRATIVE INTERFACE FOR VIRTUAL MACHINE INSTANTIATION ALLOWS A USER TO SELECT FROM A SUBSET OF PREDETERMINED AVAILABLE RESOURCES ASSIGNED TO THE USER

FIELD

The disclosure relates in general to virtual machines, and more particularly to a virtual machine client administrative interface.

BACKGROUND

In some virtual machine management schemes, virtual machines are created by an administrator and then used by users who are remote to the administrator. The user of a virtual machine may not have any privileges, for example, to create virtual machines. Oftentimes, users with many different needs implement virtual machines to meet their needs. For example, virtual machines may be used by programmers, information technology specialists, business developers, and salespersons for very different purposes. As a result, administrators often provide general purpose virtual machines that may be used for multiple different purposes. Thus, while the virtual machine may meet some of the needs of the user, the virtual machine may not be designed with the user's needs in mind and may not perfectly meet the user's needs. As the foregoing illustrates, an approach for, among others, developing a special purpose virtual machine for a user may be desirable.

SUMMARY

In some aspects, a method for providing a virtual machine client administrative interface is provided. The method may include providing for display of a virtual machine creation console via operation of a virtual machine hosting environment, the virtual machine creation console indicating a set of predetermined available resources for virtual machine creation. The method may include facilitating receiving, from a user, an input via the virtual machine creation console, the input defining a portion of the set of predetermined available resources and one or more virtual machines to be created with the portion of the set of predetermined available resources. The method may include facilitating creating the one or more virtual machines.

In some aspects, a non-transitory machine-readable medium comprising instructions stored therein, the instructions executable by one or more processors to perform one or more operations for providing a virtual machine client administrative interface, is provided. The instructions may include code for causing the one or more processors to provide for display of a virtual machine creation console via operation of a virtual machine hosting environment, the virtual machine creation console indicating a set of predetermined available resources for virtual machine creation. The instructions may include code for causing the one or more processors to facilitate receiving an input via the virtual machine creation console, the input defining a portion of the set of predetermined available resources and one or more virtual machines to be created with the portion of the set of predetermined available resources. The instructions may include code for causing the one or more processors to facilitate creating the one or more virtual machines.

In some aspects, a processing system for providing a virtual machine client administrative interface is provided. The processing system may include one or more modules configured to provide for display of a virtual machine creation console via operation of a virtual machine hosting environment, the virtual machine creation console indicating a set of predetermined available resources for virtual machine creation. The processing system may include one or more modules configured to facilitate receiving, from a user, an input via the virtual machine creation console, the input defining a portion of the set of predetermined available resources and one or more virtual machines to be created with the portion of the set of predetermined available resources. The processing system may include one or more modules configured to facilitate creating the one or more virtual machines.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

DETAILED DESCRIPTION

Figure 1:
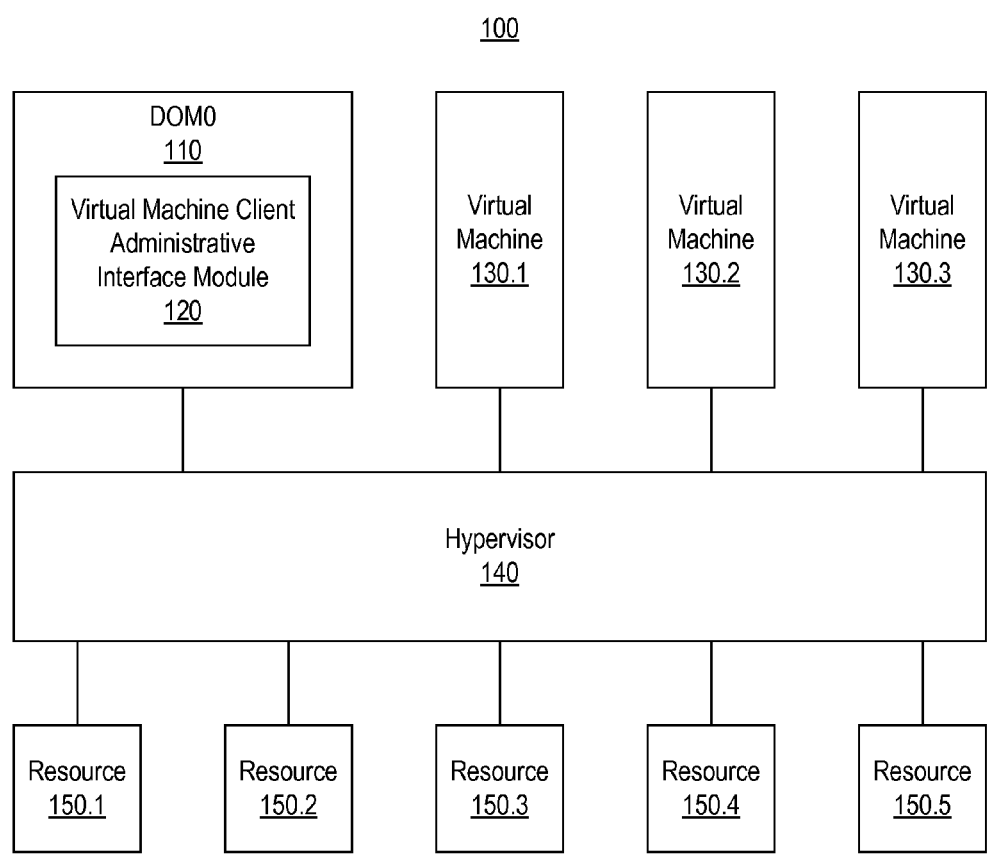
FIG. 1 is a block diagram illustrating an example of a host computer system for providing a virtual machine client administrative interface.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Virtual Machines (VMs) are developed, for example and without limitation, by VMWare, Microsoft, Xen, Parallels, and other developers. In some systems, a user may not have the ability to administer his/her own virtual machines before a virtual machine is assigned to the user. This may result in a runtime paradox. Thus, an alternative pathway to a management console permitting the creation of virtual machines under various user states may be desirable.

In some schemes, the creation of a virtual machine in an administrative environment can be completed only by a person with appropriate privileges. This may be a paradox condition, due to the fact that a person needing a virtual machine may not have any privileges before the virtual machine is created. Such a person may not yet even have a user account with the provider of the virtual machine(s). The person may not have any virtual machines or any declared relationship to the hosting environment. However, needs of users of virtual machines are very diverse. Administrators have a difficult task of administering virtual machines. Virtual machine users, such as programmers, information technology specialists, business development specialists, sales persons, and other members of an organization using virtual machines may have very different runtime needs. Thus, having a range of options possible for the creation of virtual machines may be desirable. In some aspects, the subject technology provides, among other things, a range of options for users of virtual machines to create one or more virtual machines for themselves.

Virtual machine implementations include Microsoft Hyper V® and VMWare ESX®, among other virtual machine implementations. Both Hyper V® and ESX® may, in some implementations, require that an administrator create and assign access of virtual machines to users. In some aspects, the subject technology provides, among other things, a template allowing a user or a group of users to create a virtual machine or a type of virtual machine. Creating a generalized form of virtual machine may ease the instantiation of a virtual machine in a server of a client-server environment or in an environment where isolated computing is desirable in a disposable computing paradigm.

In some aspects, the subject technology provides, among other things, temporary virtual machines, access to existing virtual machines, ability to disable, keep, or administer virtual machines, leveraging of profiles for the creation, administration, and definition of virtual machines by any single user or group of users.

Elements of the subject technology may include, among other things, groups (e.g., groups of users who have varied credentialed permissions), users (e.g., users who have permission to access to a given paradigm), administrators, virtual machines (e.g., Linux®, Windows®, cross-platform), servers, and clients.

Virtual machines may include, for example and among other things, virtual machines of various types running natively or interpretively. Examples of virtual machines (VMs) may include Linux® VMs, Windows® VMs, Windows XP® VMs, Windows NT® VMs, Windows 2008r2® VMs, Windows w2k3® VMs, PowerPC® VMs, IOS® VMs, etc.

In some aspects, templates may include approaches for describing typical virtual machine embodiment with specific components that are abstracted until instantiated.

Advantageously, the subject technology may provide, among other things, differing access to virtual machine architectures and resources for virtual machines to users or groups of users based on the permissions of the users or groups of users. Virtual machines may be created on-the-fly and virtual machines may be disposable, or virtual machines may be permanent and may persist through multiple computing sessions.

Example Host Computer System for Providing a Virtual Machine Client Administrative Interface FIG. 1 is a block diagram illustrating an example of a host computer system 100 for providing a virtual machine client administrative interface.

The host computer system 100 may be a server. For example, the host computer system 100 may correspond to the server computing device 604 of FIG. 6, described in detail below. The host computer system 100 may correspond to a cloud computing device implementing infrastructure as a service (IaaS). As shown, the host computer system 100 includes a Domain 0 (DOM0) 100, multiple virtual machines 130.1-130.3, a hypervisor 140, and multiple resources 150.1-150.5. While three virtual machines 130.1-130.3 and five resources 150.1-150.5 are illustrated, the subject technology may be implemented with any number of virtual machines and/or any number of resources.

The resources 150.1-150.5 may correspond to any resources that may be controlled by one virtual machine 130.1-130.3 or shared by two or more virtual machines 130.1-3. Example resources 150.1-150.5 may include operating systems, random access memory, hard drives, central processing units, graphics processing units, etc. The resources 150.1-150.5 may include one or more of access to network(s), access to network interface card(s) (NICs), access to network address translators (NATs), access to switch(es), access to disk(s), access to memory, etc. The resources 150.1-150.5 may correspond to logical or physical definitions providing machine-specific function at various levels of operation when viewed as a hierarchical model. The resources 150.1-150.5 may include predetermined available resources, for example, resources assigned to a user by an administrator. The resources 150.1-150.5 may include software resources or hardware resources accessible to the virtual machines 130.1-130.3 and by DOM0 110 via the hypervisor 140. One or more of the virtual machines 130.1-130.3 may be associated with one of the resources 150.1-150.5. The one of the resources 150.1-150.5 may indicate specific functions for the one or more virtual machines 130.1-130.3. Example specific functions may include data management, computation, graphics processing, managing and storing sales data, managing and storing business development data, etc. The resources 150.1-150.5 may include any number of resources (e.g., one resource, ten resources, 100 resources, 1000 resources, etc.).

The hypervisor 140 is configured to allow one or more guest operating systems (e.g., operating systems of virtual machines 130.1-3) to run concurrently on the host computer system 100 and to access the resources 150.1-150.5 of the host computer system. The hypervisor 140 may present a virtual operating platform to each of the virtual machines 130.1-130.3 and manage the execution of the operating systems of the guest virtual machines 130.1-130.3. The hypervisor 140 may be the lowest layer of software installed on the host computer system 100, which may be an x86-based computing system or any other computing system. In one example architecture, a thin layer of software that implements partitioning and other lower-level virtualization capabilities runs directly on hardware (e.g., directly on the portion of the resources 150.1-150.5 that correspond to hardware resources), but underneath the software that implements higher-level virtualization services.

As set forth above, the hypervisor 140 may be the lowest and most privileged software layer. The hypervisor 140 may support one or more guest operating systems (e.g., operating systems of DOM0 110 and/or of virtual machines 130.1-130.3). The first guest operating system, the operating system of DOM0 110, may be executed automatically when the hypervisor 140 boots and may receive special management privileges and direct access to all physical hardware (e.g., the portion of the resources 150.1-150.5 that correspond to hardware resources) by default. DOM0 110 may be accessible to the administrator and/or to users who are authorized to create additional virtual machines, for example, virtual machines 130.1-130.3. DOM0 110 may correspond to an administrative module of the computer system 100 that boots automatically when the computer system 100 is booted.

As shown, the DOM0 110 includes a virtual machine client administrative interface module 120. The virtual machine client administrative interface module 120 may function to facilitate allowing a user to create one or more virtual machines (e.g., one or more of virtual machines 130.1-130.3) executing on the host computer system 100 via the hypervisor 140. The virtual machine client administrative interface module 120 may be configured to provide for display (e.g., via a remote client computing device, such as client computing device 602 of FIG. 6, described in detail below, or via a local display device coupled to the host computer system 110) of a virtual machine creation console (e.g., virtual machine creation console 200 of FIG. 2). The virtual machine creation console may indicate a set of predetermined available resources (e.g., all or a portion of the resources 150.1-150.5) for virtual machine creation. The virtual machine client administrative interface 120 may facilitate receiving, from a user, (e.g., a user of a remote client computing device or a user of the local display device) an input via the virtual machine creation console. The input may define a portion of the set of predetermined available resources and one or more virtual machines (e.g., one or more of the virtual machines 130.1-130.3) to be created with the portion of the set of predetermined available resources. The virtual machine client administrative interface 120 may facilitate creating the one or more virtual machines.

The virtual machines 130.1-130.3 may include any number of virtual machines (e.g., one virtual machine, ten virtual machines, 100 virtual machines, 1000 virtual machines, etc.). Each virtual machine 130.1-130.3 may consume one or more of the resource 150.1-150.5. A resource 150.1-150.5 may be consumed by a single virtual machine 130.1-130.3, shared by multiple virtual machines 130.1-130.3, or consumed by no virtual machine 130.1-130.3. Similarly, a virtual machine 130.1-130.3 may consume a single resource 150.1-150.5 or multiple resources 150.1-150.5. The virtual machine(s) 130.1-130.3 may be configured to access the resource(s) 150.1-150.5 via operation of the hypervisor 140.

It should be noted that FIG. 1 illustrates one example of a host computer system 100. However, the subject technology may be implemented with any other host computer system 100. For example, as illustrated in FIG. 1, DOM0 110 resides externally to the hypervisor 140. However, in some implementations, DOM0 110 may reside within the hypervisor 140.

In some aspects, the subject technology may be implemented in conjunction with an administrator and/or a user of the host computer system 100. The user may be a user of one or more of the virtual machines 130.1-130.3. The administrator may be able to access (e.g., restart, modify features of, grant or deny access to physical and/or logical networks, etc.) all of the virtual machines 130.1-130.3. In one aspect, the user may only be able to access the virtual machine(s) 130.1-130.3 that were assigned to the user.

In some examples, an administrator may determine which physical or logical networks are available to virtual machine(s) assigned to a user. The user may select one or more physical or logical network(s) that are available to a given virtual machine(s). A physical network may include a network that includes physical devices (e.g., a physical server, a physical wire, etc.) A logical network may include a network that lacks physical devices and includes only logical or software components. For example, several virtual machines or software modules that are configured to communicate data with one another may form a virtual network together.

Example Virtual Machine Creation Console

Figure 2:
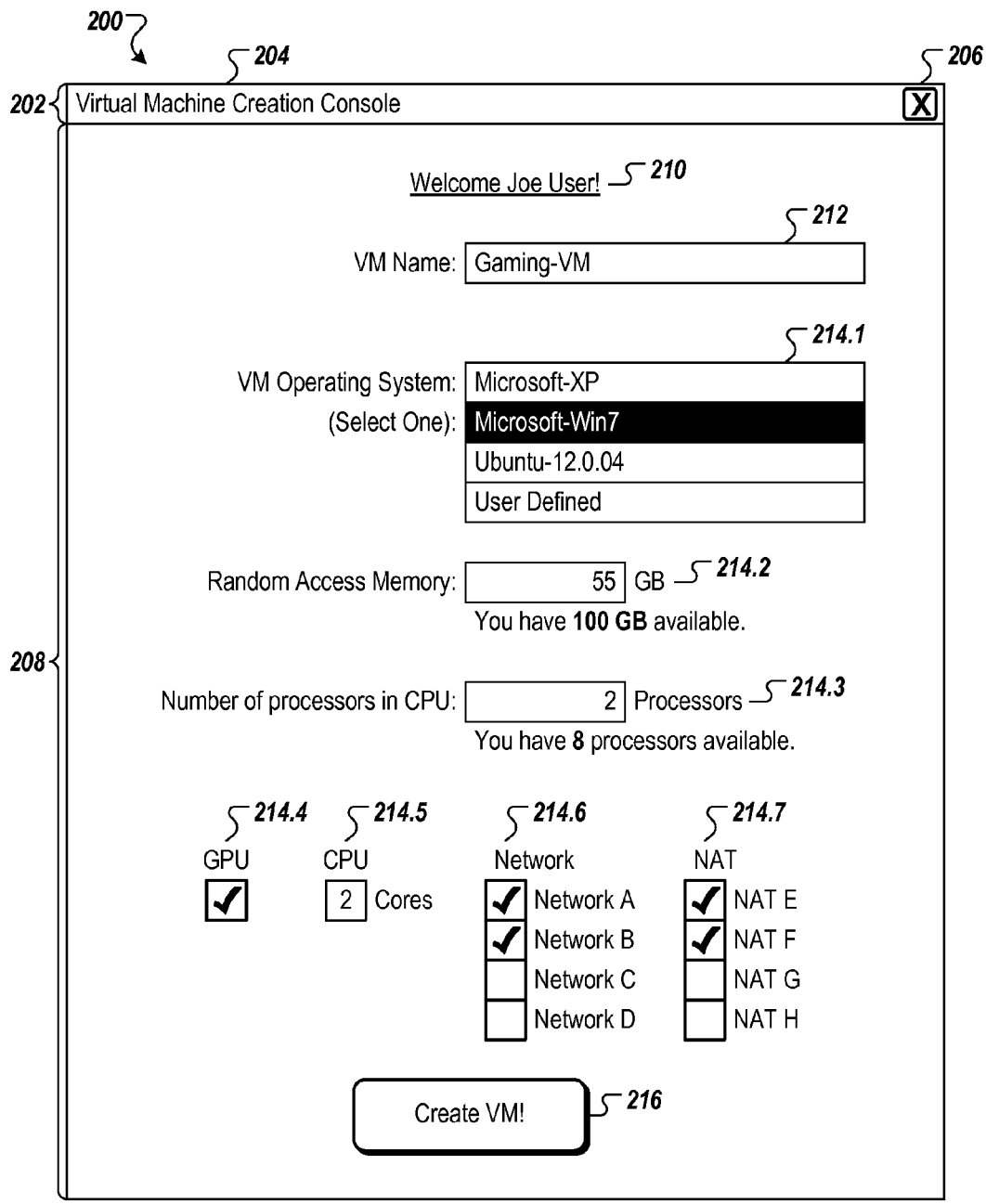
FIG. 2 illustrates an example of a virtual machine creation console.

FIG. 2 illustrates an example of a virtual machine creation console 200. The virtual machine creation console 200 may correspond to a user interface for creating virtual machine(s), which may be provided, for example, by the virtual machine client administrative interface module 120. The virtual machine creation console 200 may be displayed via a local display device coupled to the host computer system 100 or via a client computing device (e.g., client computing device 602, where the host computer system 100 is implemented within the server computing device 604). The virtual machine creation console 200 may be displayed within a web browser window or within a special purpose application window. As shown, the virtual machine creation console 200 includes a header 202 and a body 208.

In one aspect, a virtual machine can be created by user using a virtual machine creation console that allows a user to create the configurations (e.g., by selecting one or more of the configuration features made available to the user as shown in FIG. 2) for the virtual machine that the user is permitted to access.

As illustrated, the header 202 of the virtual machine creation console 200 includes a title 204 ("Virtual Machine Creation Console"), and a close button 206. the title 204 indicates the title of the virtual machine creation console 200. The close button 206, when selected, is configured to cause the virtual machine creation console 200 to close.

As illustrated, the body 208 of the virtual machine creation console 200 includes a welcome message 210, a virtual machine name input box 212, inputs 214.1-214.7 for indicating resources to be consumed by a virtual machine that is being created, and a "Create VM" button 216, where VM refers to virtual machine.

The welcome message 210 may indicate a name or other identifier of the user, for example, "Welcome Joe User!"

The virtual machine name input box 212 may allow the user to name the virtual machine that is being created so that the user may identify or reference the virtual machine. As illustrated, the user has entered the name "Gaming-VM," for the virtual machine that is being created.

The inputs 214.1-214.7 for indicating resources to be consumed by the virtual machine that is being created allow the user to specify an operating system (OS) 214.1, an amount of random access memory (RAM) 214.2, a number of processors in the central processing unit (CPU) 214.3, graphics processing unit (GPU) access 214.4, number of cores in the CPU 214.5, network access 214.6, or network address translator (NAT) access 214.7 for the virtual machine that is being created. It should be noted that the input fields provided in the inputs 214.1-214.7 are examples and are not exhaustive. In some examples, the user may be able to input other data (e.g., a default natural language or time zone setting) for the virtual machine being created.

As illustrated, the selections for the inputs 214.1-214.7 are limited based on the resources. The resources may correspond to the resources of a virtual machine hosting environment (e.g., host computer system 100) or the resources to which a user has access, as negotiated or agreed between the user and an administrator of the virtual machine hosting environment. For example, in input 214.1, a user may select, via operation of a selection list, an operating system from among the operating systems "Microsoft-XP," "Microsoft-Win7," "Ubuntu-12.0.04," and a user defined operating system, for the virtual machine being created. However, as illustrated, the user may not select any other operating system (e.g., Apple OS X) for the virtual machine. The user may have purchased permissions to create virtual machine(s) running Microsoft-XP, Microsoft-Win7, and Ubuntu-12.0.04, but not Apple OS X from the administrator of the virtual machine hosting environment. As illustrated, the user has selected Microsoft-Win7 as the operating system for the virtual machine that the user is in the process of creating.

Similarly, as indicated in conjunction with input 214.2, the user has 100 GB of random access memory (RAM) available for his/her virtual machine(s) under his/her agreement with the administrator of the virtual machine hosting environment. The user may have purchased 100 GB of RAM from the administrator, the user may have purchased more RAM (e.g., 150 GB) and may be using a portion of the RAM (e.g., 50 GB) in other virtual machine(s), or only 100 GB of RAM may be available in a hardware system associated with the virtual machine hosting environment.

In addition, in input 214.3, the user may select up to eight processors for the central processing unit (CPU) of his/her virtual machine. The user's agreement with the administrator of the virtual machine hosting environment may indicate that the user has access to eight processors, which could be allocated to virtual machine(s) created by the user. In input 214.4, the user may select whether the virtual machine that the user is in the process of creating will have access to a GPU by operation of a check box. As illustrated, the user has selected to allow the virtual machine to access the GPU. The administrator may allow the user to have the user's virtual machine(s) access the GPU resource, for example, based on the agreement between the user and the administrator or the needs of the user.

In input 214.5, the user may enter a number of cores for the CPU of the virtual machine that is in the process of being created. As illustrated, the user entered an input corresponding to two CPU cores. The agreement between the user and the administrator of the virtual machine hosting environment may indicate that the user may create virtual machines having a certain number of cores, e.g., four or fewer cores.

In input 214.6, the user may select which networks the virtual machine that is in the process of being created may access via operation of checkboxes. As illustrated, the user has indicated that the virtual machine may access "Network A" and "Network B," but not "Network C" or "Network D." The administrator may allow virtual machine(s) created by the user to access "Network A," "Network B," "Network C" or "Network D." However, the administrator may not allow the user's virtual machines to access other networks.

In input 214.7, the user may select which NATs the virtual machine that is in the process of being created may access via operation of checkboxes. As illustrated, the user has indicated that the virtual machine may access "NAT E" and "NAT F," but not "NAT G" or "NAT H." The administrator may allow virtual machine(s) created by the user to access "NAT E," "NAT F," "NAT G" or "NAT H." However, the administrator may not allow the user's virtual machines to access other networks.

Upon entering his/her selections for the inputs 214.1-214.7, a user may select the "Create VM" button 216. The "Create VM" button 216, when selected, is configured to facilitate creating a virtual machine based on the input entered by the user in input box 212 and inputs 214.1-214.7.

The administrator may be different from the user. The administrator and the user may be different entities, who operate different client computing devices from different locations. For example, the virtual machine system may be associated with a corporation. The administrator may be based in a main office of the corporation, while the user may be a programmer based in a branch office of the corporation.

In some aspects, a hierarchy of controls is provided between the administrator and the user. In one aspect, the administrator has all of the controls for all of the virtual machines. The administrator may provide, to the user, all or a portion of the controls for the user's virtual machine(s). The user may adjust the settings for his/her virtual machine(s) according to the controls provided to him/her by the administrator.

Under the hierarchy of control, the administrator may create DOM0 110 or have access to DOM0 110. In one implementation, the administrator always has access to DOM0 110. The administrator may have access to all of the virtual machine(s) and may be able to modify any resource(s) accessible to any virtual machine. Resources may include, for example, processors, random access memory (RAM), disk space, or software. The administrator may provide, to the user, access to DOM0 110 for accessing the user's virtual machine(s), and allow the user to access all of the resources accessible to DOM0 110 for his/her virtual machines. Alternatively, the administrator may limit the user's access to the resources accessible to DOM0 110. In one aspect, a user may have the ability to power on, power off, or restart a virtual machine, but may lack the ability to modify the processors, RAM, disk space, or software installed on a virtual machine. In one aspect, a user may have the ability to modify software installed on a virtual machine, but may lack the ability to modify the representations of hardware (e.g., processors, RAM, or disk space) for the virtual machine.

In some aspects, the administrator may access a checkbox interface for delegating control over virtual machine(s) to user(s). Via the checkbox interface, the administrator may be able to select which virtual machine(s) are to be assigned to a given user (e.g., the virtual machine(s) created by the user) and which control(s) the user will have over the virtual machine(s) assigned to the user. For example, the administrator may be able to select (or deselect) checkboxes to give the user control over (or limit the user's control over) one or more of a virtual machine's: processor(s), RAM, disk space, software, hardware, basic input/output structure (BIOS), Small Computer Systems Interface (SCSI) controller, network adapter(s), port(s), etc. The administrator may have a separate checkbox for each granularity of control that the administrator may delegate to the user. Alternatively, the administrator may be able to assign to the user a number (e.g., one, two, ten, etc.) of processors, RAM units, disk space units, etc., via an input box for text or numbers.

In some aspects, an administrator has the ability to control, for example, by strict granularity the actions that are permitted or not permitted for user(s) to take with respect to virtual machine(s). Furthermore, a first user who is allowed to take certain action(s) (e.g., read, write, delete, run, restart, take a snapshot, etc.) with respect to certain virtual machine(s) may be able to permit other user(s) to take similar action(s). However, in one aspect, the first user cannot delegate more privilege(s) than he/she has with respect to the virtual machine(s) to other users. For example, a first user who has permission to read and write to a first virtual machine may permit a second user to read the first virtual machine. However, in one example, a first user who has permission to read but not write a first virtual machine cannot give a second user permission to write to the first virtual machine (as the first user lacks such permission him/herself). Furthermore, in some implementations, a user may be constrained not to harm the virtual machine(s) accessible to other user(s) (which may contain, for example, the work of the other user(s)). For example, if multiple users can access a certain virtual machine, all of the multiple users may need to consent to deleting the virtual machine. In another example, if multiple users can access a virtual machine, all of the multiple users or a portion of the multiple users may be able to delete the virtual machine without the consent of the other users.

Advantageously, in some implementations of the subject technology, access of user(s) and administrator(s) to virtual machine(s) (e.g., virtual machines 130.1-130.3) associated with a hypervisor (e.g., hypervisor 140) may be similar (e.g., analogous) to access of user(s) and administrator(s) to file(s) in a shared file system or operating system. Examples of shared file systems include Google Documents® and Microsoft Worksite/iManage®. In both Google Documents® and Microsoft Worksite/iManage®, some administrator(s) and/or user(s) have certain privilege(s) (e.g., read, write, or delete) with respect to file(s) in the file system. Similarly, in some implementations of the subject technology, some administrator(s) and user(s) may have similar privileges (e.g., read, write or delete) with respect to virtual machine(s) associated with the hypervisor.

In some aspects, the computer system 100 can track or record the activity of administrator(s) or user(s) on the computer system 100, such that an action of one user may be undone by another user or an administrator having appropriate permissions. As a result, a malicious user may be unable to permanently modify or delete virtual machine(s) storing valuable information. Alternatively, the computer system 100 may occasionally (e.g., once every hour, six hours, 24 hours, week, month, etc.) take snapshots of all or a portion of the computer system 100 to allow a user or an administrator having appropriate permissions to cause the computer system 100 to revert to a prior state (e.g., a state that existed before an error or a virus was detected, or a state that existed before a malicious user modified virtual machine(s)) of the computer system 100.

As used herein, an "administrator" can refer to a single administrator, a single administrator account, a group of administrators, or a group of administrator accounts. As used herein, a "user" can refer to a single user, a single user account, a group of users, or a group of user accounts. A group of administrators may include two or more administrators who access a computer system (e.g., computer system 100) via a single shared administrator account or via multiple different administrator accounts. A group of users may include two or more users who access the computer system via a single shared user account or via multiple different user accounts. In some aspects, administrator(s) can create user account(s), and some users can create other user account(s).

Example Operation of Virtual Machine Client Administrative Interface

Figure 3A:
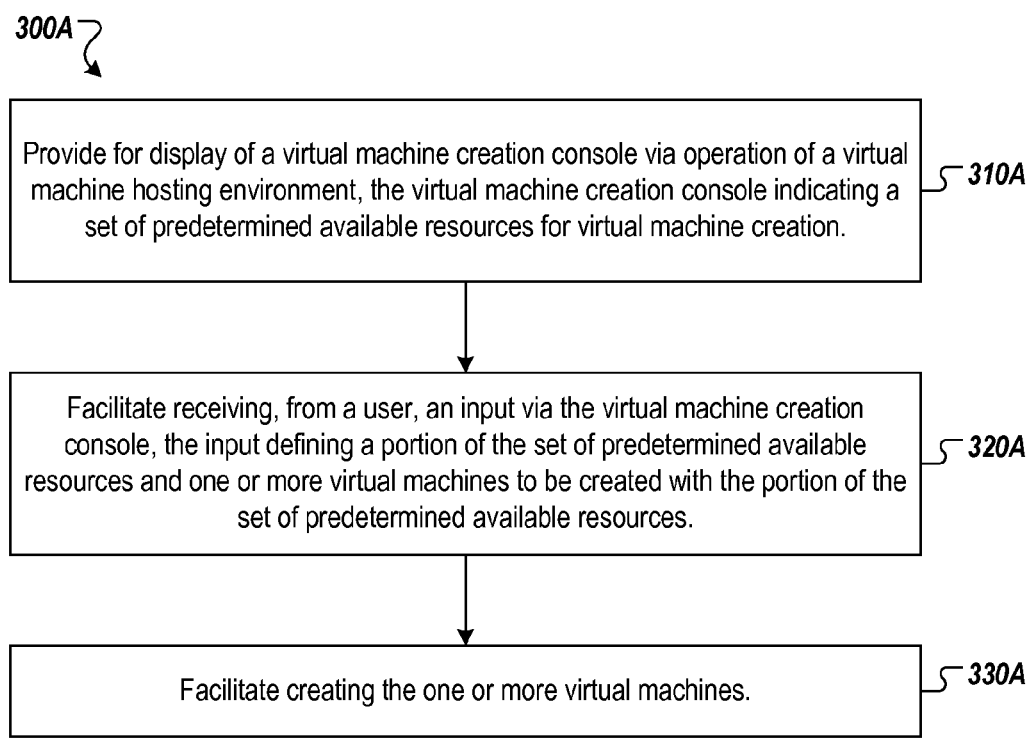
FIG. 3A is a flow chart illustrating an example of an operation of a virtual machine client administrative interface.

FIG. 3A is a flow chart illustrating an example of a process 300A for an operation of a virtual machine client administrative interface.

The process 300A begins at operation 310A, where the virtual machine hosting environment (e.g., the host computers system 100, via operation of the virtual machine client administrative interface module 120 in DOM0 110) provides for display (e.g., via a local display or via a client computing device in a client-server system, where the virtual machine hosting environment corresponds to the server) of a virtual machine creation console (e.g., virtual machine creation console 200). The virtual machine creation console indicates a set of predetermined available resources for virtual machine creation.

In operation 320A, the virtual machine hosting environment facilitates receiving, from a user, an input via the virtual machine creation console. The input defines a portion of the set of predetermined available resources and one or more virtual machines to be created with the portion of the set of predetermined available resources.

In operation 330A, the virtual machine hosting environment facilitates creating the one or more virtual machines. After operation 330A, the process 300A ends.

In some examples, the user may be a member of multiple users (e.g., multiple subscribers to a service that provides virtual machines). The predetermined available resources may correspond to predetermined available resources provided to the user (e.g., based on the user's agreement with the service that provides virtual machines, based on selections entered by an administrator of the service that provides virtual machines, etc.). The virtual machine hosting environment may facilitate receiving, from the administrator of the service that provides virtual machines, an assignment of corresponding available resources for each of the multiple users. Resources corresponding to a first user of the multiple users may be different from resources corresponding to a second user of the multiple users. For example the first user may be able to create virtual machines implementing a first operating system (e.g., Linux Ubuntu®) but not a second operating system (e.g., Microsoft Windows®), while the second user may be able to create virtual machines implementing either the first operating system or the second operating system. A third user may be able to create virtual machines implementing only a third operating system (e.g., Google Chromium®).

The virtual machine hosting environment may be a single virtual machine hosting environment (e.g., host computer system 100) associated with a single hypervisor (e.g., hypervisor 140). The single virtual machine hosting environment and the single hypervisor may be associated with each and every corresponding predetermined available resource (e.g., resources 150.1-150.5) for each and every one of the multiple users (who may create virtual machines 130.1-130.3). The virtual machine hosting environment may include DOM0 (e.g., DOM0 110). DOM0 may reside either externally to the hypervisor or within the hypervisor.

In some aspects, a use console (e.g., virtual machine creation console 200) is provided to anyone who connects to a virtual machine hosting environment (e.g., to DOM0). In some aspects, DOM0 management is permitted to users (e.g., non-administrators or managers at a reduced level). In some aspects, users (e.g., reduced level managers) have administrative ability to create virtual machines of various types as permitted from the administrator (higher-level administrator of the virtual machine hosting environment). Advantageously, a hierarchy of administration may be provided and permissions to allow non-administrator users to manage their environments and to define or create virtual machines and support interfaces as may be required or desirable by the non-administrator users.

Figure 3B:
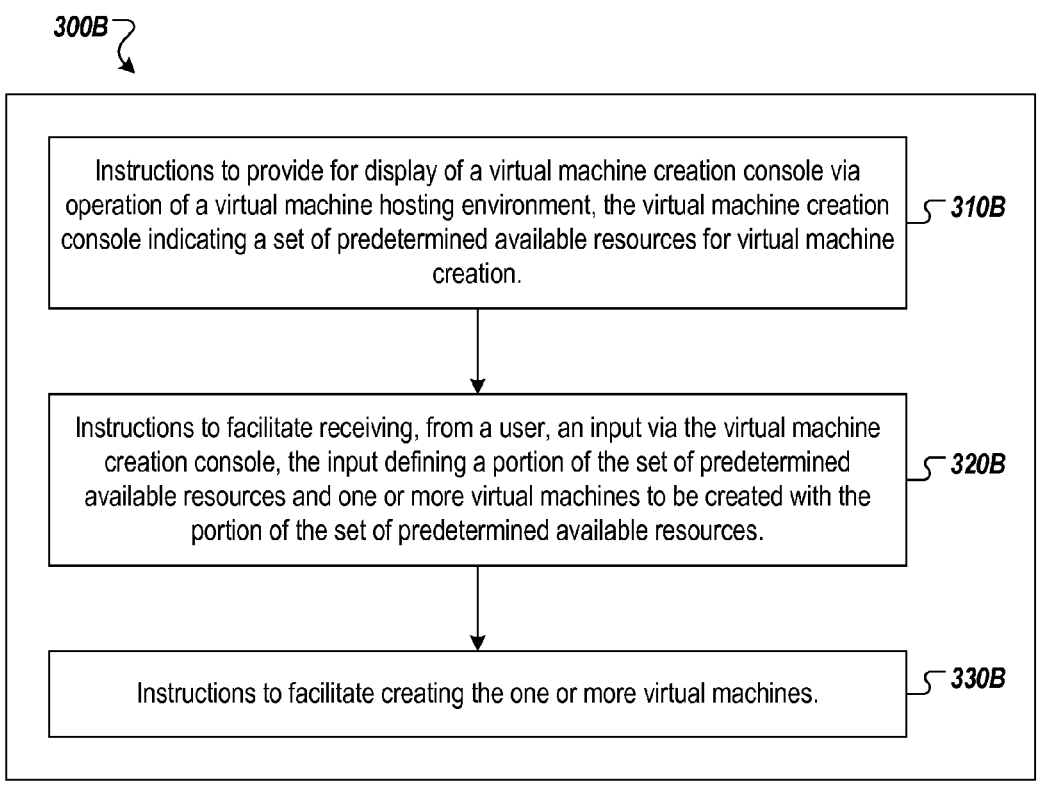
FIG. 3B is an example of a device including instructions for an operation of a virtual machine client administrative interface.

Example Instructions for Operation of Virtual Machine Client Administrative Interface FIG. 3B is an example of a device 300B including instructions for an operation of a virtual machine client administrative interface.

The device 300B may include instructions 310B to provide for display of a virtual machine creation console via operation of a virtual machine hosting environment, the virtual machine creation console indicating a set of predetermined available resources for virtual machine creation.

The device 300B may include instructions 320B to facilitate receiving, from a user, an input via the virtual machine creation console, the input defining a portion of the set of predetermined available resources and one or more virtual machines to be created with the portion of the set of predetermined available resources.

The device 300B may include instructions 330B to facilitate creating the one or more virtual machines.

Figure 3C:
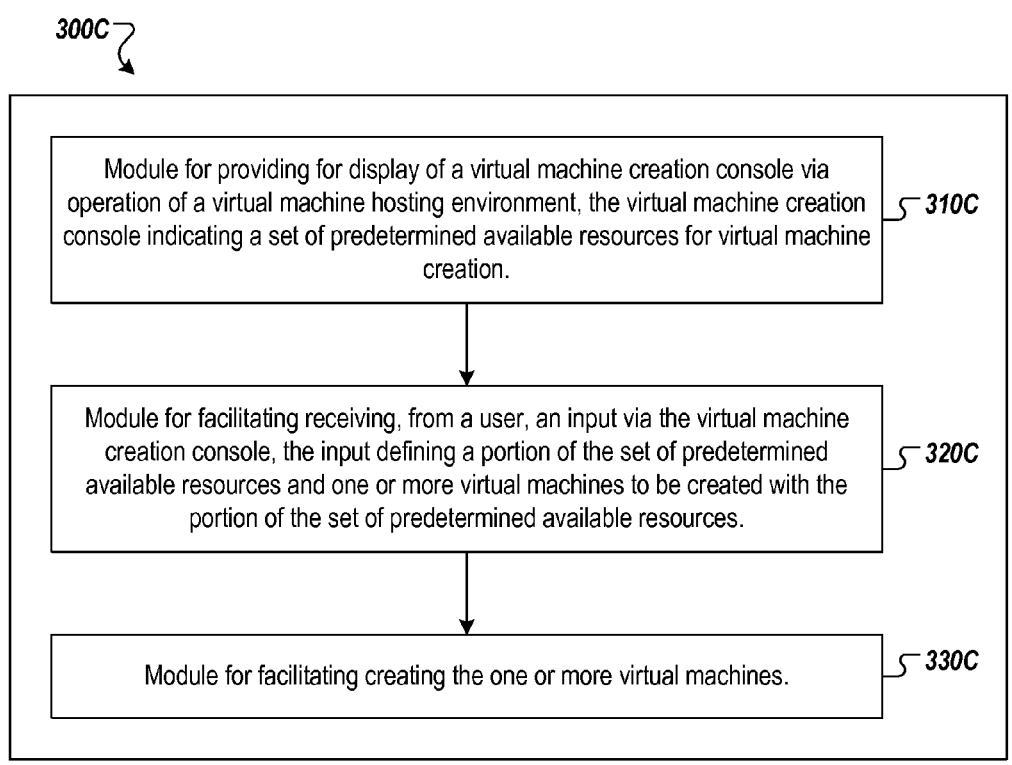
FIG. 3C is an example of a device including one or more modules for an operation of a virtual machine client administrative interface.

Example Modules for Operation of Virtual Machine Client Administrative Interface FIG. 3C is an example of a device 300C including one or more modules for an operation of a virtual machine client administrative interface.

The device 300C may include a module 310C for providing for display of a virtual machine creation console via operation of a virtual machine hosting environment, the virtual machine creation console indicating a set of predetermined available resources for virtual machine creation.

The device 300C may include a module 320C for facilitating receiving, from a user, an input via the virtual machine creation console, the input defining a portion of the set of predetermined available resources and one or more virtual machines to be created with the portion of the set of predetermined available resources.

The device 300C may include a module 330C for facilitating creating the one or more virtual machines.

Example Virtualization System

Figure 4:
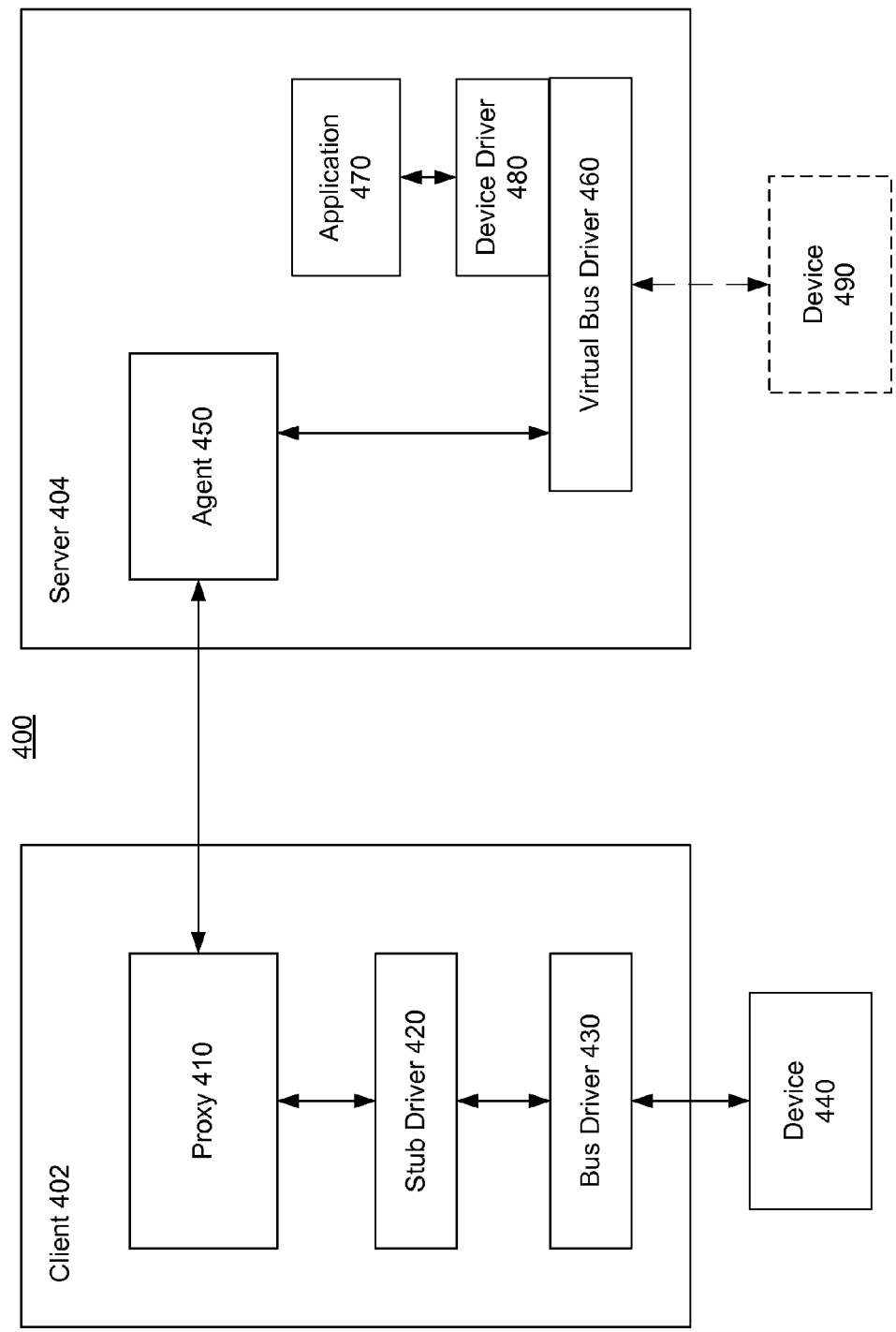
FIG. 4 is a conceptual block diagram of a local device virtualization system.

FIG. 4 is a block diagram of a local device virtualization system 400, according to an aspect of the disclosure. The system 400 may include the client 402 in communication with the server 404, for example, over a network (as illustrated in detail in FIG. 6). The client 402 may include a proxy 410, a stub driver 420, and a bus driver 430. The client 402 can be connected to a device 440, as shown in FIG. 4. The server 404 may include an agent 450, and a virtual bus driver 460.

According to the illustrated configuration, while the device 440 is not locally or physically connected to the server 404 and is remote to the server 404, the device 440 appears to the server 404 as if it is locally connected to the server 404, as discussed further below. Thus, the device 440 appears to the server 404 as a virtual device 490.

By way of illustration and not limitation, the device 440 may be a machine-readable storage medium (e.g., flash storage device), a printer, a scanner, a camera, a facsimile machine, a phone, an audio device, a video device, a peripheral device, or other suitable device that can be connected to the client 402. The device 440 may be an external device (i.e., external to the client 402) or an internal device (i.e., internal to the client 402).

In one aspect of the disclosure, the device 440 is a Universal Serial Bus (USB) device that can be locally connected to the client 402 using a wired USB or wireless USB connection and communicates with the client 402 according to a USB communications protocol. In another aspect, the device 440 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 440 is a local device of client 402. Furthermore, in one aspect of the disclosure, a local device of a system or a device locally connected to a system may include a device within the system (e.g., an internal device of client 402).

A "remote" device, or a device "remote" to a system, may be a device that is not directly connected to the system. For example, the server 404 is remote to both client 402 and device 440 because server 404 is not directly connected to client 402 or device 440 but connected indirectly through network 606 (illustrated in FIG. 6), which can include, for example, another server, or the Internet.

The bus driver 430 can be configured to allow the operating system and programs of the client 402 to interact with the device 440. In one aspect, when the device 440 is connected to the client 402 (e.g., plugged into a port of the client 402), the bus driver 430 may detect the presence of the device 440 and read information regarding the device 440 ("device information") from the device 440. The device information may include features, characteristics and other information specific to the device. For an example of a USB device, the device information may comprise a device descriptor (e.g., product ID, vender ID and/or other information), a configuration descriptor, an interface descriptor, an endpoint descriptor and/or a string descriptor. The bus driver 430 may communicate with the device 440 through a computer bus or other wired or wireless communications interface.

In one aspect, a program (e.g., application) running locally on the client 402 may access the device 440. For example, the device 440 may be accessed locally when the client 402 is not connected to the server 404. In this aspect, the operating system (e.g., Microsoft Windows®) of the client 402 may use the device information to find and load an appropriate device driver (not shown) for the device 440. The device driver may provide the program with a high-level interface to the device 440.

In one aspect, the device 440 may be accessed from the server 404 as if the device were connected locally to the server 440. For example, the device 440 may be accessible from the desktop running on the server 404 (i.e., virtual desktop environment). In this aspect, the bus driver 430 may be configured to load the stub driver 420 as the default driver for the device 440. The stub driver 420 may be configured to report the presence of the device 440 to the proxy 410 and to provide the device information (e.g., device descriptor) to the proxy 410.

Figure 6:
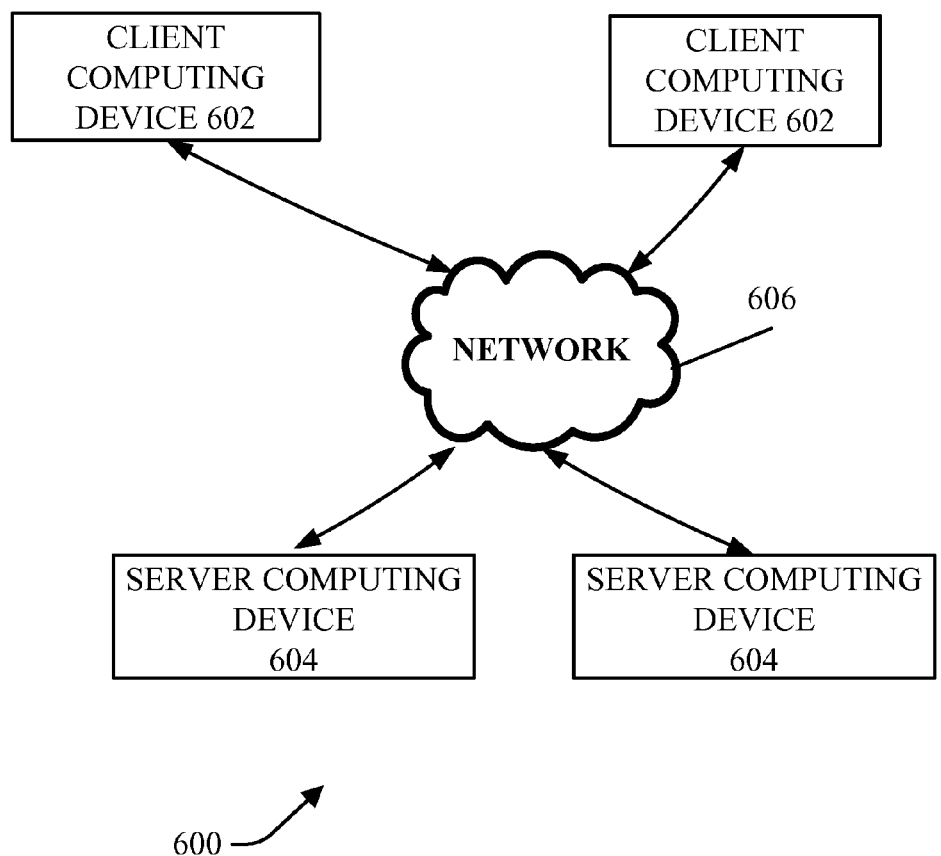
FIG. 6 illustrates a simplified diagram of an example of a network system.

The proxy 410 may be configured to report the presence of the device 440, along with the device information, to the agent 450 of the server 404 over the network 606 (illustrated in FIG. 6). Thus, the stub driver 420 redirects the device 440 to the server 404 via the proxy 410.

The agent 450 may be configured to receive the report from the proxy 410 that the device 440 is connected to the client 402 and the device information. The agent 450 can provide notification of the device 440, along with the device information, to the virtual bus driver 460. The virtual bus driver 460 may be configured to report to the operating system of the server 404 that the device 440 is connected and to provide the device information to the operating system. This allows the operating system of the server 404 to recognize the presence of the device 440 even though the device 440 is connected to the client 402. The operating system of the server 404 may use the device information to find and load an appropriate device driver 480 for the device 440 at the server 404, an example of which is illustrated in FIG. 4. As a result, the device 440 is enumerated on the server 404. Once the presence of the device 440 is reported to the operating system of the server 404, the device 440 may be accessible from the desktop running on the server 404 (i.e., virtual desktop environment). For example, the device 440 may appear as an icon on the virtual desktop environment and/or may be accessed by applications running on the server 404.

In one aspect, an application 470 running on the server 404 may access the device 440 by sending a transaction request for the device 440 to the virtual bus driver 460 either directly or through the device driver 480. The virtual bus driver 460 may direct the transaction request to the agent 450, which sends the transaction request to the proxy 410 over the network 606. The proxy 410 receives the transaction request from the agent 450, and directs the received transaction request to the stub driver 420. The stub driver 420 then directs the transaction request to the device 440 through the bus driver 430.

The bus driver 430 receives the result of the transaction request from the device 440 and sends the result of the transaction request to the stub driver 420. The stub driver 420 directs the result of the transaction request to the proxy 410, which sends the result of the transaction request to the agent 450 over the network 606. The agent 450 directs the result of the transaction request to the virtual bus driver 460. The virtual bus driver 460 then directs the result of the transaction request to the application 470 either directly or through the device driver 480.

Thus, the virtual bus driver 460 may receive transaction requests for the device 440 from the application 470 and send results of the transaction requests back to the application 470 (either directly or through the device driver 480). As such, the application 470 may interact with the virtual bus driver 460 in the same way as a bus driver for a device that is connected locally to the server 404. The virtual bus driver 460 may hide the fact that it sends transaction requests to the agent 450 and receives the results of the transaction requests from the agent 450 instead of a device that is connected locally to the server 404. As a result, the device 440 connected to the client 402 may appear to the application 470 as if the physical device 440 is connected locally to the server 404.

While resources 150.1-150.5 of FIG. 1 can be implemented as physical devices attached locally to the hypervisor 140 within a host computer system 100, in another example, one or more of the resources 150.1-150.5 of FIG. 1 may be located at a remote device such as a client 402 of FIG. 4. In this example, the device 440 may correspond to one or more of the resources 150.1-150.5 accessible to the one or more virtual machines 130.1-130.3, and the user of the client 402 may determine whether the server 404, or one or more virtual machines 130.1-130.3 on the server 404, may access the device 440. The one or more virtual machines 130.1-130.3 may correspond to, for example, one or more instances of the application 470 of the server 404. When the server 404 is accessed through the client 402, the server 404 has access to its local resources (e.g., one or more of 150.1-150.5) and the device 440 (implemented on the server as virtual device 490).

However, in one aspect, if the server 404 is accessed from a computing device different from client 402, the virtual machine(s) 130.1-130.3 and/or any other software running on the server 404 may not have access to the device 440. In such circumstances, the virtual machine(s) 130.1-130.3 may still have access to one or more resource(s) 150.1-150.5 that reside virtually or locally on the server 104. For example, device 440 may correspond to a local mouse of the client 402, which may be implemented as a virtual device 490 (virtual mouse) on the server 404. Resource(s) 130.1-130.3 residing on the server may include, for example, central processing unit(s), graphic processing unit(s), memory, etc.

In one aspect, resources 150.1-150.5 may be physically implemented (or located) at other client devices besides the client 402 and/or the server 404.

In one aspect, a computing device (e.g., a client) may communicate with server 404 to facilitate creating a virtual machine(s) by utilizing a virtual machine creation console and one or more of the resources (e.g., 150.1-150.5), where the resources may be implemented as physical devices locally at the server 404 and/or virtual devices (e.g., virtual device 490) of the server 404, where the physical devices corresponding to the virtual devices are located at a computing device(s) (e.g., client 402) other than the server 404.

Example of Computing Device

Figure 5:
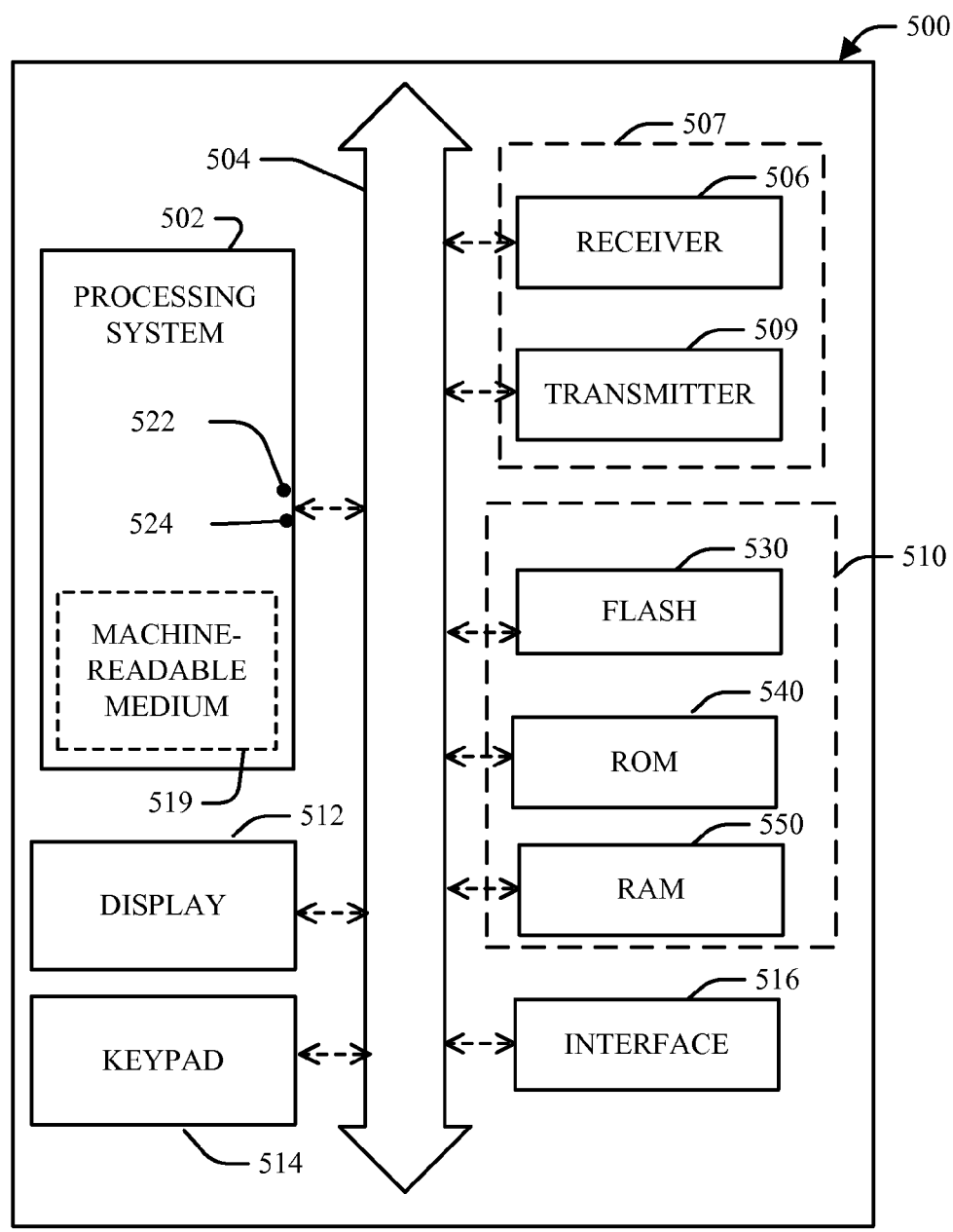
FIG. 5 is a conceptual block diagram illustrating an example of a computing device.

FIG. 5 is a conceptual block diagram illustrating an example of a computing device.

A computing device 500 may be, for example, any of the computer system 100, the client 402, the server 404, the client computing device 602, or the server computing device 604. A computing device may comprise one or more computing devices.

A computing device 500 may include an processing system 502. The processing system 502 is capable of communication with a receiver 506 and a transmitter 508 through a bus 504 or other structures or devices. It should be understood that communication means other than busses can be utilized with the disclosed configurations. The processing system 502 can generate commands, messages, and/or other types of data to be provided to the transmitter 509 for communication. In addition, commands, messages, and/or other types of data can be received at the receiver 506, and processed by the processing system 502.

The processing system 502 may operate in conjunction with a general-purpose processor or a specific-purpose processor for executing instructions and may further include a machine-readable medium 519 for storing data and/or instructions for software programs. The instructions, which may be stored in a machine-readable medium 510 and/or 519, are executable by the processing system 502 to control and manage access to the various networks, as well as provide other communication and processing functions. The instructions may also include instructions executable by the processing system 502 for various user interface devices, such as a display 512 and a keypad 514. The processing system 502 may include an input port 522 and an output port 524. Each of the input port 522 and the output port 524 may include one or more ports. The input port 522 and the output port 524 may be the same port (e.g., a bi-directional port) or may be different ports.

The processing system 502 may be implemented using software, hardware, or a combination of both. By way of example, the processing system 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client computing device, an HTTP server, a web server) or by a processing system (e.g., an operating system, an HTTP server, or a web server). Instructions can be, for example, a computer program including code.

A machine-readable medium can be one or more machine-readable media. A machine-readable medium (e.g., 510) may include storage external to an operating system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. The machine-readable medium 519 may be a non-transitory machine-readable medium. A non-transitory machine-readable medium may include one or more volatile and/or non-volatile memories. A machine-readable medium 519 may include storage integrated into a processing system, such as might be the case with an application specific integrated circuit (ASIC). A memory may be a machine-readable medium (e.g., 510 or 519) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium. A machine-readable medium can be one or more media, and may be a non-transitory machine-readable medium, which can include, for example, a volatile and/or a non-volatile memory.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processing system 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network System

FIG. 6 illustrates a simplified diagram of an example of a computer network system in accordance with an aspect of the present disclosure.

A computer network system 600 may include one or more client computing devices 602 (e.g., laptop computers, desktop computers, tablets, PDAs, mobile phones, etc.) in communication with one or more server computing devices 604 (e.g., a server such as an HTTP server, a web server, an enterprise server, etc.) via a network 606. In one aspect, a server computing device 604 is configured to allow remote sessions (e.g., remote desktop sessions) wherein users can access applications and files on the server computing device 604 by logging onto the server computing device 604 from a client computing device 602. Such a connection may be established using any of several well-known techniques such as the remote desktop protocol (RDP) on a Windows-based server or the techniques disclosed herein for a non-Windows-based server.

In one aspect of the disclosure, a client computing device 602 may be an end-user computing device, such as a laptop or desktop computer. In one aspect, a server computing device 604 may be a terminal services gateway (TSGW) server or a remote desktop gateway (RDGW) server.

By way of illustration and not limitation, a client computing device 602 can represent a computer, a mobile phone, a laptop computer, a tablet, a thin computing device, a personal digital assistant (PDA), a portable computing device, a virtual machine, or a suitable device with a processor. In one example, a client computing device 602 is a smartphone (e.g., iPhone, Android phone, Blackberry, etc.). In certain configurations, a client computing device 602 can represent an audio player, a game console, a camera, a camcorder, an audio device, a video device, a multimedia device, or a device capable of supporting a connection to a remote computing device. In an advantageous example, a client computing device 602 is mobile. In another advantageous example, a client computing device 602 is a hand-held device. In another example, a client computing device 602 can be stationary. In one example, a client computing device 602 may be a device having at least a processor and memory, where the total amount of memory of the client computing device 602 is less than the total amount of memory in a server computing device 604. In an advantageous example, a client computing device 602 does not have a hard disk. In one advantageous aspect, a client computing device 602 has a display smaller than a display supported by a server computing device 604.

In one aspect, a server computing device 604 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server computing device 604 can be stationary. In another aspect, a server computing device 604 can be mobile. In certain configurations, a server computing device 604 may be any device that can represent a computing device. In one aspect, a server computing device 604 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client computing device 602 and a server computing device 604 are remote with respect to each other, a client computing device 602 may connect to a server computing device 604 over a network 606, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 606 can be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

In one aspect, the subject technology provides software code, component(s) or module(s) to allow an administrator to perform one or more of the operations (as described herein to be performed by an administrator). For example, the software code, component(s) or module(s) may authenticate (e.g., verify a user name and a password of) an administrator, receive input from the administrator, and/or provide output to the administrator.

In one aspect, the subject technology provides software code, component(s) or module(s) to allow a user to perform one or more of the operations (as described herein to be performed by a user). For example, the software code, component(s) or module(s) may authenticate (e.g., verify a user name and a password of) a user, receive input from the user, and/or provide output to the user.

In one aspect, the subject technology provides code for administrating one or more processors to be used by a DOM0 set of virtual machines or a maximal value to be used within a DOM0 environment. This will enable the allocated resources to a first user to be administrated in a limited context or delegated if desired by the first user to one or more other users needing a set of privileges or controls that is as limited as or more limited than the privileges and controls of the first user.

Example of Multi-User Virtual Machine Access System

Figure 7:
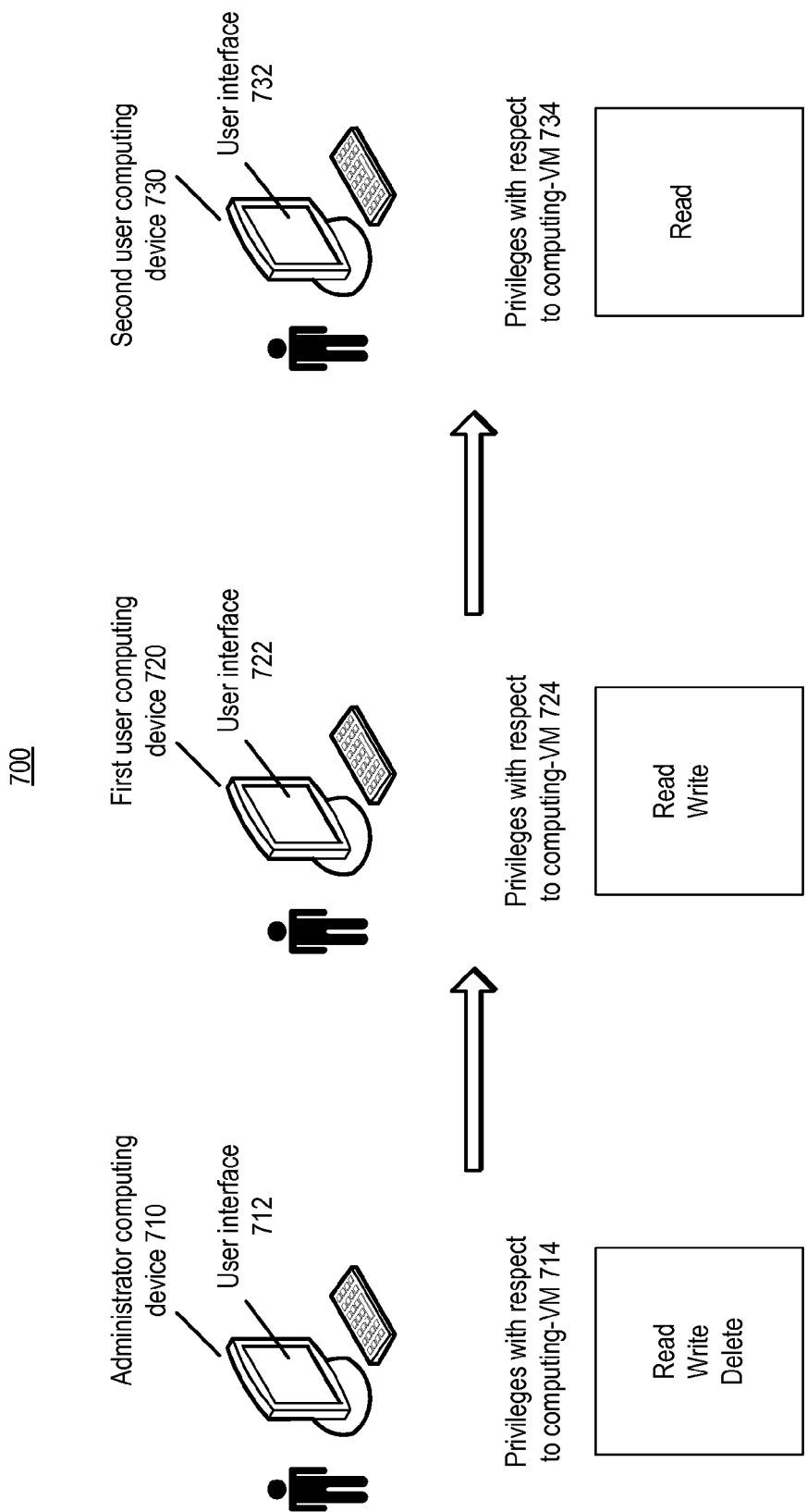
FIG. 7 illustrates an example of a multi-user virtual machine access system.

FIG. 7 illustrates a multi-user virtual machine access system 700. The multi-user virtual machine access system 700 may be implemented in conjunction with the system 100, including the virtual machine client administrative interface module 120, of FIG. 1.

As shown, the system 700 includes an administrator computing device 710, a first user computing device 720, and a second user computing device 730. The administrator computing device 710 may be accessed by an administrator via an administrator account. The first user computing device 720 may be accessed by a first user via a first user account. The second user computing device 730 may be accessed by a second user via a second user account. The administrator account, first user account, and second user account may, in some examples, be created by operation of the virtual machine client administrative interface module 120.

The administrator computing device 710 may display a user interface 712. The user interface 712 may be provided by operation of the virtual machine client administrative interface module 120. The administrator computing device 710 (or the administrator account) has read, write, and delete privileges 714 with respect to a virtual machine called "computing-VM."

The first user computing device 720 may display a user interface 722. The user interface 722 may be provided by operation of the virtual machine client administrative module 120. The first user computing device 720 (or the first user account) has read and write, but not delete privileges 724 with respect to the virtual machine called "computing-VM." The read and write privileges may have been delegated to the first user computing device 720 (or the first user account) by the administrator computing device 710 (or the administrator account) via operation of the virtual machine client administrative module 120.

The second user computing device 730 may display a user interface 732. The user interface 732 may be provided by operation of the virtual machine client administrative module 120. The second user computing device 730 (or the second user account) has read, but not write and delete privileges 734 with respect to the virtual machine called "computing-VM." The read privileges may have been delegated to the second user computing device 730 (or the second user account) by the first user computing device 720 (or the first user account) administrator computing device 710 (or the administrator account) via operation of the virtual machine client administrative module 120.

In some aspects, the virtual machine client administrative module 120 is configured to carry out one or more of the following operations: providing a user interface for an administrator to delegate control (e.g., read privileges, write privileges, delete privileges, etc.) over one or more virtual machine(s) to a first user; providing a user interface for the first user to delegate control (e.g., read privileges, write privileges, delete privileges, etc.) over one or more virtual machine(s) to a second user, where the second user has less control over the virtual machine(s) than the first user or the same control over the virtual machine(s) as the first user; providing a user interface for the administrator, the first user, or the second user to access (e.g., read, write, delete, etc.) virtual machine(s) upon verifying that the administrator, the first user, or the second user has appropriate permissions for the access.

The virtual machine client administrative module 120 may be implemented as a single module or as multiple modules. The single module or multiple modules may reside on a single computing device, on multiple different computing devices, or in the cloud (e.g., in a cloud computing environment).

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A computer-implemented method for providing a virtual machine client administrative interface, the method comprising:

providing for display of a virtual machine creation console via operation of a virtual machine hosting environment, the virtual machine creation console indicating a set of predetermined available resources for virtual machine creation;

facilitating receiving, from a user, an input via the virtual machine creation console, the input defining a portion of the set of predetermined available resources and one or more virtual machines to be created with the portion of the set of predetermined available resources; and facilitating creating the one or more virtual machines.

2. The method of clause 1, wherein the user is a member of a plurality of users, and wherein the predetermined available resources comprise corresponding predetermined available resources for the user, the method further comprising:

facilitating receiving, from an administrator, an assignment of corresponding available resources to each user within the plurality of users, wherein the administrator is different from the user.

3. The method of clause 2, wherein first corresponding available resources for a first user are different from second corresponding available resources for a second user.

4. The method of clause 2, wherein the virtual machine hosting environment is a single virtual machine hosting environment associated with a single hypervisor, wherein the single hypervisor is adapted to provide for one or multiple virtual machines executing within the virtual machine hosting environment, and wherein the single virtual machine hosting environment and the single hypervisor are associated with each and every corresponding predetermined available resources for each and every member of the plurality of users.

5. The method of clause 1, wherein the virtual machine hosting environment comprises DOM0, wherein DOM0 is an administrative module in a computer system for hosting the one or more virtual machines.

6. The method of clause 1, wherein the predetermined available resources comprise software resources or hardware resources accessible via a hypervisor.

7. The method of clause 1, wherein one of the one or more virtual machines is associated with one of the predetermined available resources, wherein the one of the predetermined available resources indicates specific functions for the one of the one or more virtual machines.

8. A non-transitory machine-readable medium comprising instructions stored therein, the instructions executable by one or more processors to perform one or more operations for providing a virtual machine client administrative interface, the instructions comprising:

code for causing the one or more processors to provide for display of a virtual machine creation console via operation of a virtual machine hosting environment, the virtual machine creation console indicating a set of predetermined available resources for virtual machine creation;

code for causing the one or more processors to facilitate receiving an input via the virtual machine creation console, the input defining a portion of the set of predetermined available resources and one or more virtual machines to be created with the portion of the set of predetermined available resources; and code for causing the one or more processors to facilitate creating the one or more virtual machines.

9. The non-transitory machine-readable medium of clause 8, wherein the code for causing the one or more processors to facilitate receiving the input via the virtual machine creation console comprises:

code for causing the one or more processors to facilitate receiving, from a user, the input via the virtual machine creation console.

10. The non-transitory machine-readable medium of clause 9, wherein the user is a member of a plurality of users, and wherein the predetermined available resources comprise corresponding predetermined available resources for the user, the instructions further comprising:

code for causing the one or more processors to facilitate receiving, from an administrator, an assignment of corresponding available resources to each user within the plurality of users, wherein the administrator is different from the user.

11. The non-transitory machine-readable medium of clause 10, wherein first corresponding available resources for a first user are different from second corresponding available resources for a second user.

12. The non-transitory machine-readable medium of clause 10, wherein the virtual machine hosting environment is a single virtual machine hosting environment associated with a single hypervisor, wherein the single hypervisor is adapted to provide for one or multiple virtual machines executing within the virtual machine hosting environment, and wherein the single virtual machine hosting environment and the single hypervisor are associated with each and every corresponding predetermined available resources for each and every member of the plurality of users.

13. The non-transitory machine-readable medium of clause 8, wherein the virtual machine hosting environment comprises DOM0, wherein DOM0 is an administrative module in a computer system for hosting the one or more virtual machines.

14. The non-transitory machine-readable medium of clause 8, wherein the predetermined available resources comprise software resources or hardware resources accessible via a hypervisor.

15. The non-transitory machine-readable medium of clause 8, wherein one of the one or more virtual machines is associated with one of the predetermined available resources, wherein the one of the predetermined available resources indicates specific functions for the one of the one or more virtual machines.

16. A processing system for providing a virtual machine client administrative interface, the processing system comprising:

one or more modules configured to provide for display of a virtual machine creation console via operation of a virtual machine hosting environment, the virtual machine creation console indicating a set of predetermined available resources for virtual machine creation;

one or more modules configured to facilitate receiving, from a user, an input via the virtual machine creation console, the input defining a portion of the set of predetermined available resources and one or more virtual machines to be created with the portion of the set of predetermined available resources; and one or more modules configured to facilitate creating the one or more virtual machines.

17. The processing system of clause 16, wherein the user is a member of a plurality of users, and wherein the predetermined available resources comprise corresponding predetermined available resources for the user, the processing system further comprising:

one or more modules configured to facilitate receiving, from an administrator, an assignment of corresponding available resources to each user within the plurality of users, wherein the administrator is different from the user.

18. The processing system of clause 17, wherein first corresponding available resources for a first user are different from second corresponding available resources for a second user.

19. The processing system of clause 17, wherein the virtual machine hosting environment is a single virtual machine hosting environment associated with a single hypervisor, wherein the single hypervisor is adapted to provide for one or multiple virtual machines executing within the virtual machine hosting environment, and wherein the single virtual machine hosting environment and the single hypervisor are associated with each and every corresponding predetermined available resources for each and every member of the plurality of users.

20. The processing system of clause 16, wherein the virtual machine hosting environment comprises DOM0, wherein DOM0 is an administrative module in a computer system for hosting the one or more virtual machines.

21. The processing system of clause 16, wherein the predetermined available resources comprise software resources or hardware resources accessible via a hypervisor.

22. The processing system of clause 16, wherein one of the one or more virtual machines is associated with one of the predetermined available resources, wherein the one of the predetermined available resources indicates specific functions for the one of the one or more virtual machines.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., DOM0 110, virtual machines 130.1-130.3, hypervisor 140, resources 150.1-150.5, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc., or a portion(s) or a combination(s) of any of the foregoing). Those skilled in the art will recognize how to implement the instructions, circuits, and processing systems.

A reference to an element in the singular is not intended to mean "one and only one" unless specifically so stated, but rather "one or more." For example, an input may refer to one or more inputs, an virtual machine may refer to one or more virtual machines, and a resource may refer to one or more resources.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., receiving, determining, providing, generating, converting, displaying, notifying, accepting, selecting, controlling, transmitting, reporting, sending, authenticating, verifying, binding, creating, or any other action or function), it is understood that such actions or functions may be performed by the item directly. In another example, when an item is described as performing an action, the item may be understood to perform the action indirectly, for example, by facilitating (e.g., enabling, causing or performing a portion of) such an action. For example, generating can refer to facilitating generation. In one aspect, performing an action may refer to performing a portion of the action (e.g., performing a beginning part of the action, performing an end part of the action, or performing a middle portion of the action).

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A computer-implemented method for providing a virtual machine client administrative interface, the method comprising:
   assigning a set of predetermined available resources to a user;
   determining availability of a subset of the set of predetermined available resources based on a current usage of the set of predetermined available resources by the user;
   displaying, via a virtual machine hosting environment, a virtual machine creation console indicating the subset of predetermined available resources for virtual machine creation, the subset of predetermined available resources including at least one of an amount of random access memory, a number of processors in a central processing unit (CPU), an access to a graphics processing unit, a number of cores in the CPU, an access to a network, or an access to a network address translator;
   receiving, from the user via the virtual machine creation console, an input defining a portion of the subset of predetermined available resources and a virtual machine to be created with the portion of the subset of predetermined available resources; and
   creating the virtual machine in the virtual machine hosting environment.

2. The method of claim 1, wherein the user is a member of a plurality of users, the method further comprising:
   receiving, from an administrator, an assignment of a plurality of available resources to each user within the plurality of users, the assignment corresponding to the set of predetermined available resources, wherein the administrator is different from the user.

3. The method of claim 2, wherein a first plurality of available resources for a first user are different from a second plurality of available resources for a second user.

4. The method of claim 2, wherein the virtual machine hosting environment is a single virtual machine hosting environment associated with a single hypervisor, wherein the single hypervisor is adapted to provide for the virtual machine executing within the virtual machine hosting environment, and wherein the single virtual machine hosting environment and the single hypervisor are associated with each and every plurality of available resources for each and every member of the plurality of users.

5. The method of claim 1, wherein the virtual machine hosting environment comprises DOM0, wherein DOM0 is an administrative module in a computer system for hosting the virtual machine.

6. The method of claim 1, wherein the set of predetermined available resources comprise software resources or hardware resources accessible via a hypervisor.

7. The method of claim 1, wherein the virtual machine is associated with one of the predetermined available resources, wherein the one of the predetermined available resources indicates specific functions for the virtual machine.

8. A non-transitory machine-readable medium comprising instructions stored therein, the instructions executable by one or more processors to perform one or more operations for providing a virtual machine client administrative interface, the instructions comprising:
   code for causing the one or more processors to assign a set of predetermined available resources to a user;
   code for causing the one or more processors to determine availability of a subset of the set of predetermined available resources based on a current usage of the set of predetermined available resource by the user;

code for causing the one or more processors to display, via a virtual machine hosting environment, a virtual machine creation console indicating subset of predetermined available resources for virtual machine creation, the subset of predetermined available resources including at least one of an amount of random access memory, a number of processors in a central processing unit (CPU), an access to a graphics processing unit, a number of cores in the CPU, an access to a network, or an access to a network address translator;

code for causing the one or more processors to receive an input via the virtual machine creation console, the input defining a portion of the subset of predetermined available resources and a virtual machine to be created with the portion of the set of predetermined available resources; and code for causing the one or more processors to create the virtual machine in the virtual machine hosting environment.

9. The non-transitory machine-readable medium of claim 8, wherein the code for causing the one or more processors to receive the input via the virtual machine creation console comprises:

code for causing the one or more processors to receive, from the user, the input via the virtual machine creation console.

10. The non-transitory machine-readable medium of claim 9, wherein the user is a member of a plurality of users, the instructions further comprising:

code for causing the one or more processors to receive, from an administrator, an assignment of a plurality of available resources to each user within the plurality of users, the assignment corresponding to the set of predetermined available resources, wherein the administrator is different from the user.

11. The non-transitory machine-readable medium of claim 10, wherein a first plurality of available resources for a first user are different from a second plurality of available resources for a second user.

12. The non-transitory machine-readable medium of claim 10, wherein the virtual machine hosting environment is a single virtual machine hosting environment associated with a single hypervisor, wherein the single hypervisor is adapted to provide for the virtual machine executing within the virtual machine hosting environment, and wherein the single virtual machine hosting environment and the single hypervisor are associated with each and every plurality of available resources for each and every member of the plurality of users.

13. The non-transitory machine-readable medium of claim 8, wherein the virtual machine hosting environment comprises DOM0, wherein DOM0 is an administrative module in a computer system for hosting the virtual machine.

14. The non-transitory machine-readable medium of claim 8, wherein the set of predetermined available resources comprise software resources or hardware resources accessible via a hypervisor.

15. The non-transitory machine-readable medium of claim 8, wherein the virtual machine is associated with one of the predetermined available resources, wherein the one of the predetermined available resources indicates specific functions for the virtual machine.

16. A processing system for providing a virtual machine client administrative interface, the processing system comprising:

a processor; and a memory communicatively coupled to the processor, the memory comprising instructions operable, when executed by the processor, to cause the processor to:

assign a set of predetermined available resources to a user;

determine availability of a subset of the set of predetermined available resources based on a current usage of the set of predetermined available resources by the user;

display, via a virtual machine hosting environment, a virtual machine creation console indicating subset of predetermined available resources for virtual machine creation, the subset of predetermined available resources including at least one of an amount of random access memory, a number of processors in a central processing unit (CPU), an access to a graphics processing unit, a number of cores in the CPU, an access to a network, or an access to a network address translator;

receive, from the user, via the virtual machine creation console, an input defining a portion of the set of predetermined available resources and a virtual machine to be created with the portion of the subset of predetermined available resources; and create the one or more virtual machines in the virtual machine hosting environment.

17. The processing system of claim 16, wherein the user is a member of a plurality of users, the instructions further cause the processor to:

receive, from an administrator, an assignment of a plurality of available resources to each user within the plurality of users, the assignment corresponding to the set of predetermined available resources, wherein the administrator is different from the user.

18. The processing system of claim 17, wherein a first plurality of available resources for a first user are different from a second plurality of available resources for a second user.

19. The processing system of claim 17, wherein the virtual machine hosting environment is a single virtual machine hosting environment associated with a single hypervisor, wherein the single hypervisor is adapted to provide for the virtual machine executing within the virtual machine hosting environment, and wherein the single virtual machine hosting environment and the single hypervisor are associated with each and every plurality of available resources for each and every member of the plurality of users.

20. The processing system of claim 16, wherein the virtual machine hosting environment comprises DOM0, wherein DOM0 is an administrative module in a computer system for hosting the virtual machine.

21. The processing system of claim 16, wherein the set of predetermined available resources comprise software resources or hardware resources accessible via a hypervisor.

22. The processing system of claim 16, wherein the virtual machine is associated with one of the predetermined available resources, wherein the one of the predetermined available resources indicates specific functions for the virtual machine.

* * * * *